United States Patent
Chen et al.

(10) Patent No.: US 8,652,354 B2
(45) Date of Patent: *Feb. 18, 2014

(54) ORGANIC ADDITIVES FOR IMPROVED LIFETIMES IN ORGANIC AND SOLUTION PROCESSIBLE ELECTRONIC DEVICES

(75) Inventors: Jian Ping Chen, Sunnyvale, CA (US); John Devin MacKenzie, Lafayette, CA (US); Xuanqi Zhang, Sunnyvale, CA (US)

(73) Assignee: Sumitomo Chemical Co. Ltd. (JP)

(*) Notice: Subject to any disclaimer, the term of this patent is extended or adjusted under 35 U.S.C. 154(b) by 218 days.

This patent is subject to a terminal disclaimer.

(21) Appl. No.: 13/185,424

(22) Filed: Jul. 18, 2011

(65) Prior Publication Data

US 2012/0049120 A1 Mar. 1, 2012

Related U.S. Application Data

(63) Continuation-in-part of application No. 12/557,316, filed on Sep. 10, 2009.

(60) Provisional application No. 61/365,218, filed on Jul. 16, 2010.

(51) Int. Cl.
- C09K 11/06 (2006.01)
- H05B 33/14 (2006.01)
- H01L 51/54 (2006.01)

(52) U.S. Cl.
USPC ............. 252/301.16; 252/301.35; 106/31.15; 106/31.32; 106/31.64; 428/917

(58) Field of Classification Search
USPC ........... 252/301.16, 301.34, 301.35; 428/917; 106/31.15, 31.32, 31.64
See application file for complete search history.

(56) References Cited

U.S. PATENT DOCUMENTS

| | | |
|---|---|---|
| 4,539,507 A | 9/1985 | VanSlyke et al. |
| 4,665,342 A | 5/1987 | Topp et al. |
| 4,885,211 A | 12/1989 | Tang et al. |
| 5,247,190 A | 9/1993 | Friend et al. |
| 5,408,109 A | 4/1995 | Heeger et al. |
| 5,682,043 A | 10/1997 | Pei et al. |
| 5,895,717 A | 4/1999 | Cao |
| 5,965,281 A | 10/1999 | Cao |
| 6,284,435 B1 | 9/2001 | Cao |

(Continued)

Primary Examiner — Carol M Koslow
(74) Attorney, Agent, or Firm — David H. Jaffer; Pillsbury Winthrop Shaw Pittman LLP

(57) ABSTRACT

Organic additives are used to improve the lifetimes of organic electronic devices, such as electroluminescent devices fabricated from polymer luminescent ink. These additives include moisture getters, thermally-activated organic/inorganic hybrids, radical scavengers, antioxidants, UV stabilizers, and photoretarders. For water and oxygen scavengers, activation at elevated temperatures or through another activation method is preferred. This allows for the handling of the device materials containing the scavenger under a lower temperature condition in air where higher levels of ambiently-supplied water or oxygen may also be present. The invention also improves operational lifetimes as getters, scavengers and similar acting additives serve to reduce detrimental reactive species that transport into the device, are generated during operation, or become reactive during operation due to the presence of excited states or external stimulation by electrical, optical or other means.

20 Claims, 13 Drawing Sheets

(56) References Cited

U.S. PATENT DOCUMENTS

| | | |
|---|---|---|
| 6,372,154 B1 | 4/2002 | Li |
| 6,605,483 B2 | 8/2003 | Victor |
| 6,743,948 B1 * | 6/2004 | Hosokawa et al. ........... 564/426 |
| 7,115,216 B2 | 10/2006 | Carter et al. |
| 2006/0093852 A1 | 5/2006 | Marsitzky et al. |
| 2006/0172448 A1 | 8/2006 | Carter et al. |
| 2006/0269657 A1 * | 11/2006 | Shimizu et al. ................ 427/66 |
| 2007/0035235 A1 | 2/2007 | Liu et al. |
| 2008/0061682 A1 | 3/2008 | Carter et al. |
| 2011/0057151 A1 | 3/2011 | Chen et al. |

* cited by examiner

ORGANIC ADDITIVES FOR IMPROVED LIFETIMES IN ORGANIC AND SOLUTION PROCESSIBLE ELECTRONIC DEVICES

RELATED APPLICATION

This application claims the benefit of U.S. Provisional Patent Application Ser. No. 61/365,218 filed Jul. 16, 2010, and is a continuation-in-part of U.S. patent application Ser. No. 12/557,316, filed Sep. 10, 2009.

FIELD OF THE INVENTION

A combination of organic additives to organic electronic devices is formulated selected from organic moisture getters, hybrid organic/inorganic additives (such as silanes) to remove moisture, radical scavengers, antioxidants, UV stablizers, and photoretarders. The formulation improves operating lifetimes of organic electronic devices such as light emitting devices using polymer-based electroluminescent ink, non-polymer light-emitting devices, and organic photovoltaics, transistors and sensors.

BACKGROUND

Electroluminescent polymers are materials that emit light when sandwiched between two suitable electrodes and when a sufficient voltage is applied. A number of electroluminescent devices have been disclosed which use organic materials as an active light-emitting layer sandwiched between two electrodes. For example, VanSlyke et al. in U.S. Pat. No. 4,539,507 disclose a device having a bilayer of two vacuum-sublimed films of small organic molecules sandwiched between two contacts. The small organic molecules however are not printable using a solution-based process. In a related patent, Friend et al. in U.S. Pat. No. 5,247,190, disclosed a device having a thin dense polymer film made up of at least one conjugated polymer sandwiched between two electrodes. Subsequently, Braun at al. in U.S. Pat. No. 5,408,109 showed that high brightness light emitting devices could be made using soluble electroluminescent polymers. Their results indicated that it may be possible to make light emitting displays using inexpensive solution-based atmospheric processing techniques, such as ink jet printing, reel-to-reel or screen printing; however, efficient device operation required the use of low work-function metals, such as Ca, that are not stable under atmospheric processing (i.e. printing) conditions.

Pei et al. describe a polymer light-emitting electrochemical cell (U.S. Pat. No. 5,682,043) which contains a solid state electrolyte and salt that is used to electrochemically dope an organic electroluminescent layer, such as a conjugated polymer, via ionic transport. This system provides the ability to achieve efficient device operation without relying on the use of low work-function metals. Following this work, Cao showed in U.S. Pat. Nos. 5,965,281 and 6,284,435 that organic anionic surfactants cause a similar effect without needing ionic transport through the polymer film. The patents described in this paragraph disclose many anions and cations that are useful in the present invention, and their disclosures are incorporated herein by reference. In theory, electrochemical doping or anionic surfactants could be used to make an electroluminescent polymer device that would be fully compatible with liquid-based processing under atmospheric conditions. Nonetheless, the electroluminescent polymer solutions mentioned in these patents are not easy applicable to many fully liquid-based manufacturing process, such as screen printing and gravure, and also have limited lifetimes.

Screen printing is one of the most promising methods to inexpensively manufacture large-area electroluminescent displays. Screen printing has been successfully applied to manufacturing large area inorganic phosphor-based electroluminescent displays by Topp et al. in U.S. Pat. No. 4,665,342. Victor et al. later showed that screen printing, and related printing techniques, can be used to manufacture polymer-based electroluminescent displays (U.S. Pat. No. 7,115,216) using a fully printable cathode. Carter et al. (U.S. Pat. No. 6,605,483) revealed a method to make a printable electroluminescent ink that improves the screen printability and performance of electroluminescent polymer solutions through the use of soluble or dispersible additives, such as gel retarders, high boiling point solvents, and ionic dopants. More recently, flexographic, gravure, capillary, nozzle, slot and spray deposition techniques have been employed to deposit organic electronic inks in similar structures including electroluminescent, photovoltaic and sensing devices. Nonetheless, these inks still suffer form lower lifetimes when fully printed.

SUMMARY OF THE INVENTION

The invention is described below with respect to polymer-based electroluminescent inks. The invention is equally applicable to other organic and solution processible electronic devices, such as charge transporting and light emitting devices based on organic semiconductor materials, non-polymer light-emitting devices, organic photovoltaics, transistors, and sensors.

The development of novel polymer luminescent ink which can be printed and utilized in electroluminescent devices with long lifetimes is desired. There are several factors that limit lifetime. However, the presence of oxygen and water in the polymer-containing film and the formation of free radicals during device operation play critical roles as they can induce reactions within the film which subsequently degrade the active materials.

Novel polymer luminescent ink formulations containing additives are used to improve the lifetimes of electroluminescent devices fabricated from polymer luminescent ink. These additives include moisture getters, thermally-activated organic/inorganic hybrids, radical scavengers, antioxidants, UV stabilizers, and photoretarders. In some cases these additives or organic or organic functionalized materials allow compatibility with the semiconductor medium or solubility in the solution ink phase. The basic requirements for being a good additive include compatibility with the luminescent polymer, miscibility with organic solvents, and efficient reaction with water, oxygen, hydrogen, or free radicals. This reaction can include transformation or sequestration of unwanted species into an inert form or a less reactive state, or they may include transformation of the unwanted species into a more volatile form or different solubility form so that they can be more easily eliminated from the active layer films. In each of these cases, for water and oxygen scavengers, activation at elevated temperatures (e.g. 40° C. to 200° C.) is preferred. This allows for the handling of the device materials containing the scavengers under a lower temperature condition where higher levels of ambiently-supplied water or oxygen may also be present. At some later point, the device material containing the scavenger can be activated. This prevents unnecessary saturation or consumption of the scavenger prior to the time the scavenging step is actually needed, such as after a device is hermetically sealed or encapsulated or when the device actually needs to be electrically activated for its intended use.

In the present invention, an organic moisture getter is used to react with residual water in the light-emitting polymer film during thermal annealing to remove it from reacting with the active materials. Some hybrid organic/inorganic additives, such as silanes, are also used to remove moisture through an hydrolysis process upon heating. In addition, radical scavengers are added to capture reactive radicals before they attack the light emitting polymer. Finally, antioxidants, UV stabilizers, and/or photoretarders are used as sacrificial agents to react with oxygen and light, respectively. Here, we demonstrate that when these additives are incorporated into the light emitting polymer layer, the electroluminescent devices containing this layer have improved lifetimes.

DETAILED DESCRIPTION OF THE INVENTION

Figure 1:
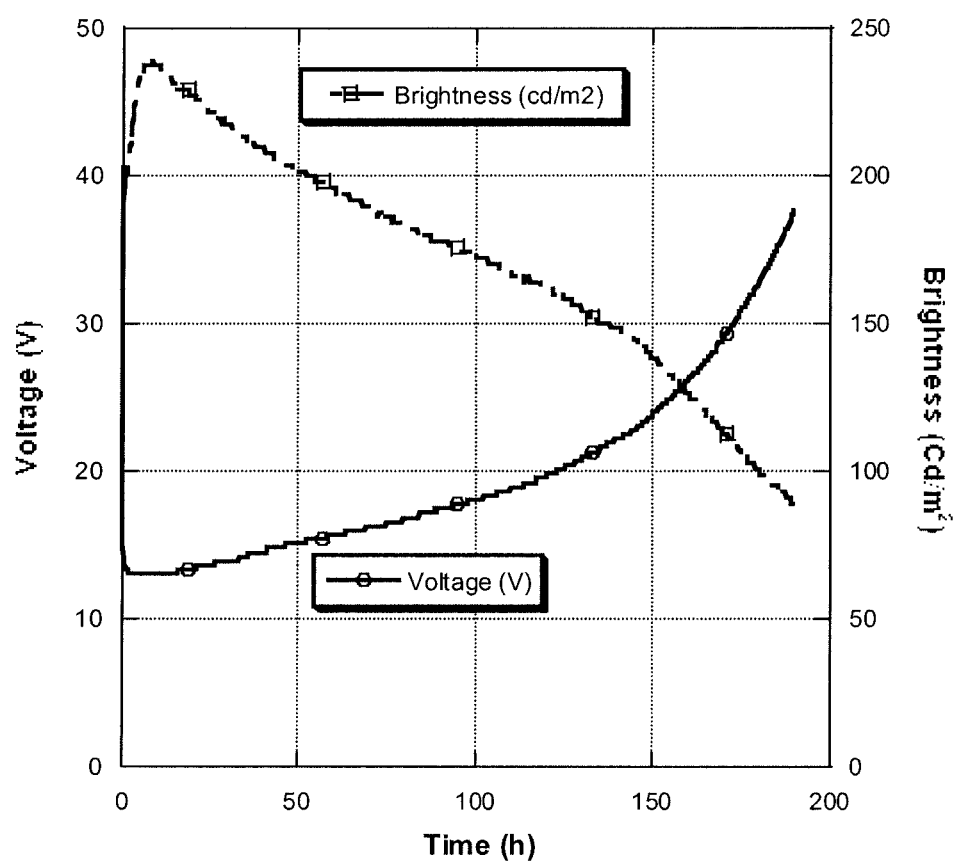
FIG. 1 shows device performance of formulation A with no additives (Example 1).

An electroluminescent polymer solution is defined to include a soluble electroluminescent (conjugated) polymer that is mixed at 0.3% to 5% by weight into solution with an appropriate solvent. An example would involve mixing 0.8% of Merck Super Yellow polyphenylene vinylene derivative into an organic solvent, such as m-xylene and chlorobenzene, to form an electroluminescent polymer solution. Examples of electroluminescent conjugated polymers include polyfluorenes, polyphenylene vinylenes, polyphenylene ethynylenes, polyvinyl carbazole, polythiophenes, polyphenylenes, polyanthracenes, and polyspiro compounds. Examples of the solvent include o-xylene, m-xylene, p-xylene, chlorobenzene, dichlorobenzene, toluene, anisole, cyclohexanone, cyclopentanone, cumene, tetrahydrofuran, dioxane, methyl benzoate, methyl anisole, acetonitrile, chloroform, trichlorobenzene, dimethylformamide, dimethylsufoxide, and N-methylpyrrolidone. In addition, the electroluminescent polymer can be added to a mixture of the solvents above.

A printable electroluminescent polymer ink is defined to include a mixture of the electroluminescent polymer solution that may include other (non-emissive) polymers, multiple ionic surfactants and/or salts, and other organic additives used to decrease material degradation. These organic additives can include moisture getters, antioxidants, photoretarders, radical scavengers, UV stabilizers, and silanes.

Typical values for the ionic salt are a ratio of 1% to 10% of the ionic salt by weight of the electroluminescent polymer. Typical values for the non-electroluminescent polymer are a molecular weight between 50,000 and 10,000,000 added into the electroluminescent polymer solution in a ratio of 2% to 100% by weight of the electroluminescent polymer, depending on the relative solubility and molecular weights. Examples of preferred salts are given below, as are examples of screen printable electroluminescent polymer inks and resulting device properties. Derivatives of these inks have been demonstrated to produce high performance gravure printable and coatable light emitting polymer (LEP) inks. The present invention also applies to bar coating, gravure printing, spray coating, flexo printing, die coating, slot coating, ink jet printing and other deposition and printing techniques.

Addition of non-electroluminescent polymers of various molecular weights to the electroluminescent polymer solution may be used to increase the viscosity of the polymer solution or to improve ionic conductivity. Preferred luminescent ink viscosity at 100 rpm at room temperature is in a range of 1 to 300 cPs. Solutions that have too low viscosity can run, or bleed, through printing screens and on the printed substrate, resulting in blurred edges due to ink flow on substrates and print surfaces, loss of patterning, and sticking between the screen and substrate. The viscosity can be increased and controlled to improve printability through the use of polymer additives of various molecular weights. Such a polymer additive should meet several conditions: it should be soluble in a similar solvent as the electroluminescent polymer; it should be electrochemically inert in the chosen medium and operating conditions; it should have an electronic structure so that no significant charge transfer occurs from the electroluminescent polymer to the polymer additive; and it should have a sufficiently large band-gap so that the polymer additive does not significantly absorb the light emission from the electroluminescent polymer. Finally, the polymer additive should have a sufficiently high decomposition temperature that it remains as a solid in the electroluminescent polymer film after the solvent is removed by heating and/or applying a vacuum to the film. Polymers that can be used include ionic conducting materials such as homopolymers or copolymers having units of ethylene oxide, propylene oxide, dimethyl siloxane, oxymethylene, epichlorohydran, phosphazene, bis-(methoxyethoxyethoxy) phosphazene, oxetane, tetrahydrofuran, 1,3-dioxolane, ethylene imine, ethylene succinate, ethylene sulfide, propylene sulfide, oligo(oxyethlene)methacrylate, oligo(oxyethylene) oxymethylene, oligo(oxyethylene) cyclotriphosphaze, and mixtures thereof.

The ionic conductor in the ink can be selected from different molecular shapes. Examples include linear ionic conducting polymer or oligomer, star-shaped ionic conducting polymer or oligomer, block-ionic conducting polymer or oligomer, randomionic conducting co-polymer or co-oligomer, dendritic-ionic conducting molecules, comb-ionic conducting polymer or oligomer, cyclic-ionic conducting molecules, or their mixtures. More specific examples are linear PEO, linear poly(propylene oxide) (PPO), linear poly(ethylene sulfide), polyphosphazene, polysiloxane, polyethylene imine, star-PEO, star-PEO with silicon core, random copolymer or co-oligomer EO-PO (propylene oxide), random copolymer or co-oligomer EO-dimethylsiloxane, random copolymer or oligomer EO-methylphenyl siloxane, dendritic PEO, dendritic PEO with silicon core, block-EO-PO-EO, block-PO-EO-PO, block-EO-dimethylsiloxane-EO, block- EO-methylphenylsiloxane-EO, comb-PEO, comb-branched polyphosphazene, branched polyethylene imine, alkyl alkoxyl, or aromatic-substituted crown ether, alkyl, or alkoxyl, or aromatic-substituted aza-crown ether, or mixtures of above two or more ionic conducting materials.

Luminescent materials may include conjugated polymers, oligomers, or dendrimers. Preferred luminescent conjugated polymers or oligomers or dendrimers contain at least one of the following repeat units: fluorene, spirofluorene, phenylene vinylene, phenylene ethynylene, carbazole, benzocarbazole, thiophene, benzothiophene, etc. Phosphorescent metal complexes can also be doped into LEP ink or chemically attached to luminescent materials.

In the ink formulation, the ionic salt can be selected from combinations of cation and anion ionic species. Examples of suitable cations are lithium cation, cesium cation, calcium cation, barium cation, rubidium cation, magnesium cation, sodium cation, potassium cation, imidazolium, pyridium, pyrrolidinium, pyrazolium, pyrazole, phosphonium, ammonium, guanidinium, uranium, thiouronium, sulfonium; examples of suitable anions are alkylsulfate, tosylate, methanesulfonate, trifluoromethanesulfonate, bis(trifluoromethylsulfonyl)imide, hexafluorophosphate, tetrafluoroborate, organoborate, thiocyanate, dicyanamide, and halides.

Multiple salts with different ionic sizes help to achieve a better balance of the ionic doping profile required to maximize charge injection at a device interface or shift the recombination zone away from either interface, and therefore improve lifetime and efficiency. A combination of salts with different mobilities can also be used to achieve faster device turn on while maintaining the longer lifetimes frequently associated with more electrochemically stable and less mobile salts. Less mobile aromatic salts that have better compatibility to LEP and result in better luminescent efficiency can be combined with more mobile non-aromatic salts for faster turn-on. The selection of salts with a specific set of desired properties is described in co-pending U.S. patent application Ser. No. 12/557,316, from which the present application claims priority.

Preferred organic solvents can dissolve all components of LEP, ionic conductor, and ionic species at room temperature or at an elevated temperature.

All the organic additives must be soluble in the ink solvents and should not chemically react with the active materials during ink mixing, printing, annealing or device operation. The concentration range is chosen to be between 0.01% to 20% by weight, relative to the weight of the active organic semiconductor materials in the ink. Finally, the additive should be colorless so that it does not absorb the emitted light.

Preferably, the luminescent ink of the present invention includes at least one luminescent material, at least one ionic salt and/or at least one ion conductor, at least one organic solvent, and at least one additive of organic moisture getter, organic/inorganic hybrid additive, radical scavenger, antioxidant, ultraviolet (UV) stabilizer, photoretarder, or mixtures of these. Examples of the additives include:

1. An organic moisture getter selected from compounds that can be hydrolyzed at temperatures ranging from room temperature (20° C.) to 200° C., and preferably between 50° C. and 200° C., for example where the structural component is a substituted oxazolidine unit. See Example 2 below, using BEOXa.
2. An organic/inorganic additive moisture getter selected from compounds that can be hydrolyzed at temperatures ranging from room temperature to 200° C, and preferably between 50° C. and 200° C., thereby removing reactive water from the LEP ink. Examples include compounds with structural components of substituted silane (such as alkyl-substituted silanes), or titanium (IV), or zirconium (IV) units. For example, these additives can include alkyl-substituted silanes that will undergo hydrolysis even at room temperature, but are more rapidly activated at higher temperatures. See Examples 10-13 below, using silanes.
3. A radical scavenger selected from compounds that can react with reactive radicals, converting them to less reactive species. For example, the radical scavenger may have a structural component that is an hydroquinone unit. See Examples 5 and 6 below, using MBQ and DMHQ.
4. The antioxidant additive is chosen so it reacts with an oxidant (i.e. a material that can oxidize or attack useful component materials in the LEP ink, in some cases in the presence of optically or electrically-generated excited states) so that it no longer acts as a reactive oxidant. The antioxidant is selected from compounds that can be preferably oxidized by oxygen, ozone, or moisture for example where the structural component consists of a vinyl, substituted phenol or a thioether unit. See Examples 3 and 4 below, using EBP and TDE.
5. A UV stabilizer selected from compounds that can absorb UV light preferably, so that UV light does not induce reactions in the LEP that could lead to photodegradation. For example, the structural component in the UV stabilizer may consist of benzophenones, benzotriazoles, triazines, benzoxazinones, hindered benzoates, or hindered amines. See Examples 7 and 8 below, using BMPP and DTHP.
6. A photoretarder additive is chosen to capture reactive ozone which can also lead to reactions with and degradation of the LEP. A photoretarder is selected from compounds that can react with light preferably, for example where the structural component is a stilbene unit.

In addition, phosphorescent metal complexes may be doped into the ink formulation or chemically attached to the luminescent material. Light emitting devices can be fabricated by printing or spin-casting luminescent ink onto an anode-patterned substrate, followed by printing or vacuum-evaporating a cathode. The device emits electroluminescent or phosphorescent light upon applying voltage or current.

The present invention removes or reduces the concentration of unwanted impurities and reactive species that are present in an ink formulation, or that are introduced into a printed feature during the deposition process or prior to encapsulation of a device. The unwanted impurities or reactive species can also be formed during device operation or be introduced through ingress of materials from the environment. In one form of the invention, the additives are temporarily inactive, of reduced activity, or latent acting at the time of deposition. The additives may act during or immediately after device fabrication, or they may act after some activation delay. In terms of duration, they may be used to remove initial residual unwanted gases, impurities, or reactive species in the ink or they may be used to remove unwanted species that appear in the ink later in its product cycle, such as by ingress through the encapsulation materials or by outgasing, or by reactions that occur within the ink itself. Materials that remove impurities or reactive species that primarily perform their function after printing using the ink are of particular interest, as these materials remove the unwanted species at a time when those species are no longer intentionally present. Such additives can be present during the fabrication of the device from printing or coating, but are able to perform their actions after the initial fabrication step. In the present invention, additives that originate in the ink are not permanently saturated or consumed by exposure in the process environment, such as while processing in air from solvent-borne solutions. The use of techniques to ensure that the additive materials are at least temporarily inactive, of reduced activity, or latent acting at the time of deposition provides improved function after the electronic device is encapsulated. The additives may then be activated through a variety of known techniques, such as thermal activation (e.g. heating to remove unwanted species to a temperature where they are active), optical activation, electrical activation, removal of a solvent or surfactant that retards activity of the additive, protection of the additive by a matrix that controls diffusion of unwanted species to the additive, or material loss during drying, heating or radiation exposure that activates the additive after the ink is printed or the devices sealed.

EXAMPLES

Standard Light-Emitting Polymer (LEP) Ink Formulation A

Example 1

In a glove box filled with nitrogen, a polyphenylene vinylene (PPV) polymer Yellow PDY132 (37 mg, Mw 1 million, Merck), polyethyleneoxide (PEO) (6 mg, Mw 600, 000, Dow), and salts of tetra-n-hexylammonium hexafluorophosphate (1.70 mg, THAPF$_6$), tetra-n-butylammonium hexafluorophosphate (0.62 mg, TBAPF$_6$), and tribenzyl-n-octylammonium hexafluorophosphate (0.45 mg, BzOAPF$_6$) were mixed together in solvents of chlorobenzene (2.5 g) and m-xylene (2.5 g). After thoroughly mixing, the ink was transferred out from the glove box and screen-printed onto a pre-patterned indium tin oxide (ITO)-coated polyethylene terephthalate (PET) substrate with an active area of 1 cm$^2$. After removing the solvents by heating the substrate, 600 nm LEP film was obtained on PET substrate. The top electrode Ag from silver paste was subsequently printed onto the luminescent polymer layer, to complete the device fabrication. The device was then transferred into a nitrogen glove box and tested under a constant current density at 4 mA/cm$^2$ (as was used in Examples 2-13). Both photocurrent and voltage were recorded as function of time (FIG. 1). Here, we have converted the lifetime at maximum brightness to lifetimes at 100 cd/m$^2$ using an extrapolation $t_{1/2} \times (Lmax/100)^y$, where $t_{1/2}$ is the time to half maximum luminance, Lmax is the maximum brightness, and y is an exponent generally varying from 1.2 to 2.1. For these PLEC devices based on Merck's Super Yellow LEP, this factor is 1.8. Thus, this device has a brightness lifetime (100 cd/m$^2$) of 800 h when 1.8 power factor is used.

LEP Ink Mixed with Organic Moisture Getter

Example 2

Figure 2:
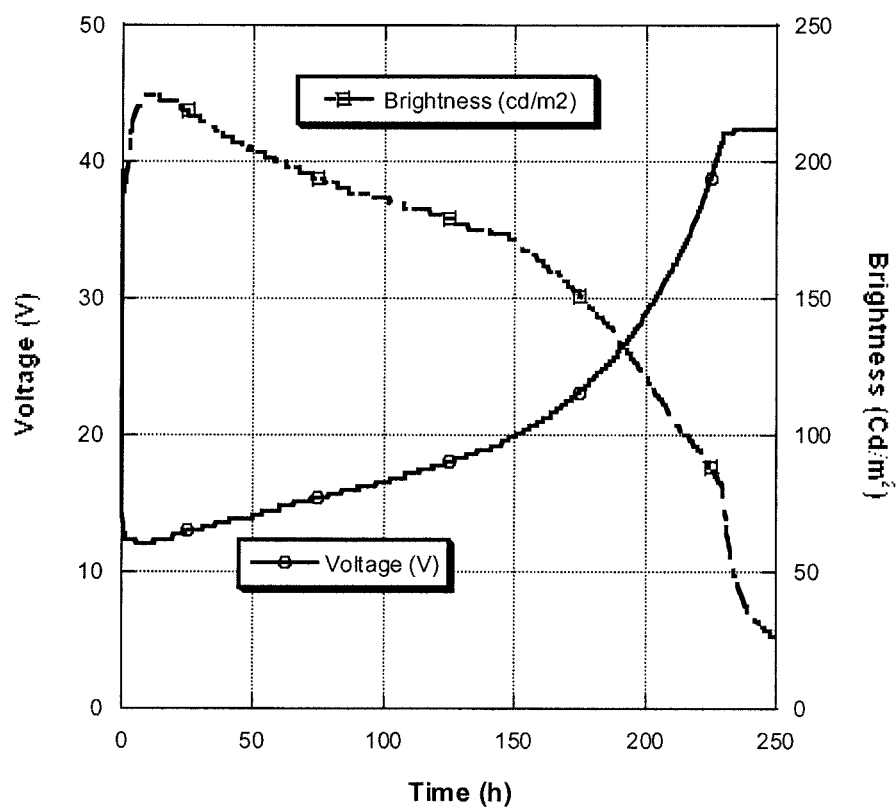
FIG. 2 shows device performance of A with the moisture getter additive of Scheme 1 (Example 2).

This ink was formulated in a similar way as described above for Example 1, but adding an additional 6 mg of 3-butyl-2-(1-ethylpentyl)oxazolidine (BEOXa, Scheme 1). BEOxa is very soluble in chlorobene/m-Xylene mixed solvents and is also compatible to LEP polymers. It is believed that BEOXa will be hydrolyzed to open the oxazolidine ring and to form the ketone-alcohol product when heated during both LEP and Ag annealing processes. Removing water in devices definitely improves PLEC lifetime as shown below in FIG. 2. It has a brightness lifetime (100 cd/m$^2$) of 900 h when 1.8 power factor is used (FIG. 2).

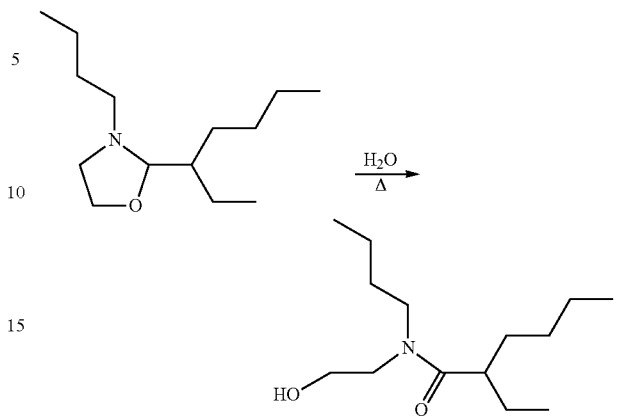

Scheme 1

LEP Ink Mixed with Antioxidant

Example 3

Figure 3:
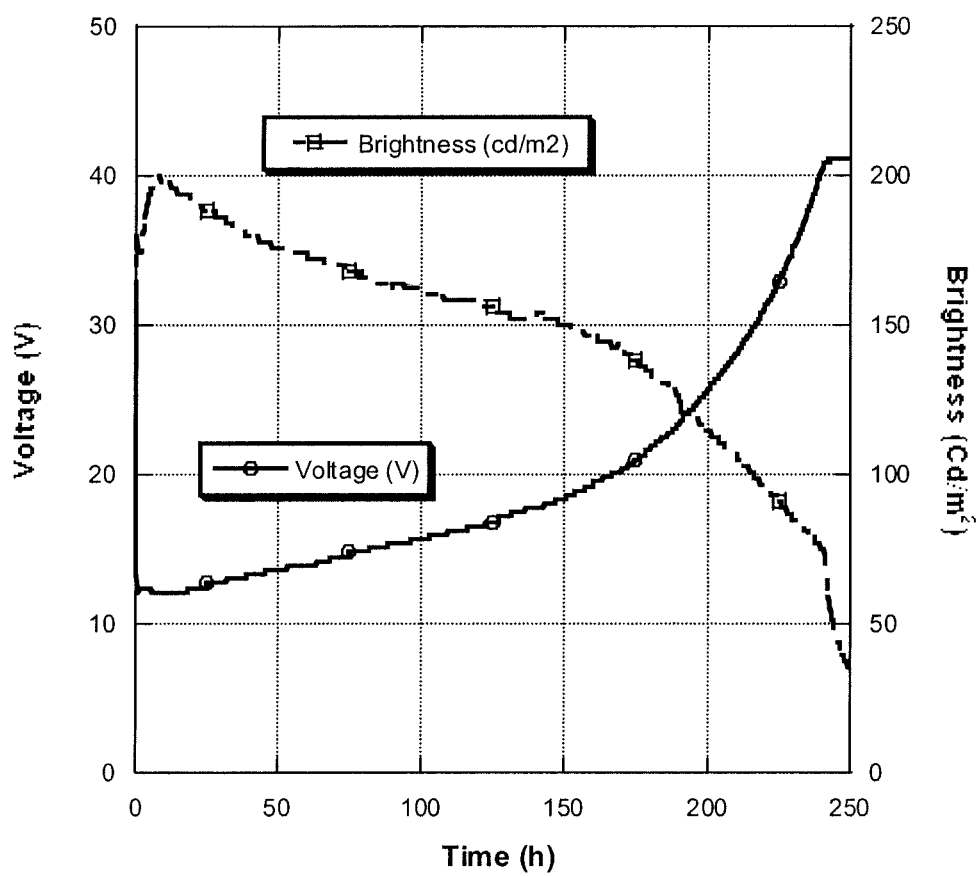
FIG. 3 shows device performance of A with the antioxidant additive of Scheme 2 (Example 3).

This ink was formulated in a similar way as described above for Example 1, by adding additional 6 mg 2,2'-ethylidene-bis(4,6-di-tert-butylphenol) (EBP, Scheme 2). It has a brightness lifetime (100 cd/m$^2$) of 800 h when 1.8 power factor is used (FIG. 3). This antioxidant EBP did not help improve device lifetime, suggesting that its compatibility with LEP was poor and its reactivity with oxidant was ineffective.

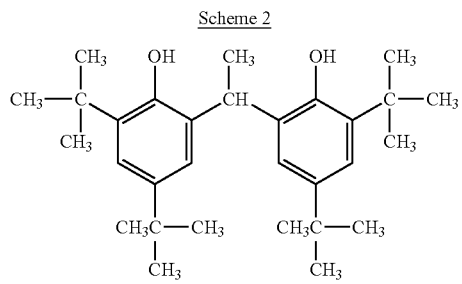

Scheme 2

Example 4

Figure 4:
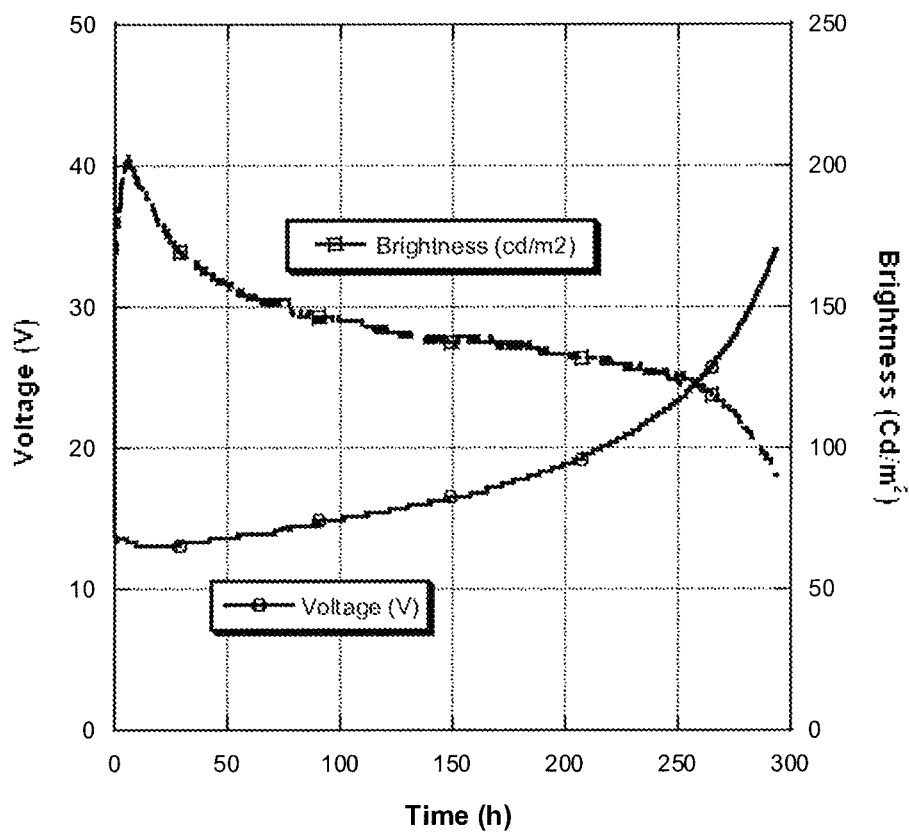
FIG. 4 shows device performance of A with the antioxidant additive of Scheme 3 (Example 4).

This ink was formulated in a similar way as described above for Example 1, by adding additional 6 mg 2,2'-Thiodiethanol (TDE, Scheme 3). It has a brightness lifetime (100 cd/m$^2$) of 1050 h when 1.8 power factor is used (FIG. 4). Due to vulnerability of LEP towards oxidants (oxygen, ozone, etc.), TDE acting as a sacrificing agent is blended into LEP film and can easily react with these oxidants, resulting in improved device lifetime.

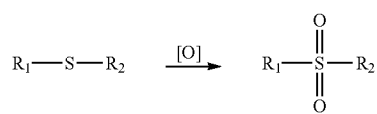

Scheme 3

LEP Ink Mixed with Radical Scavenger

Example 5

Figure 5:
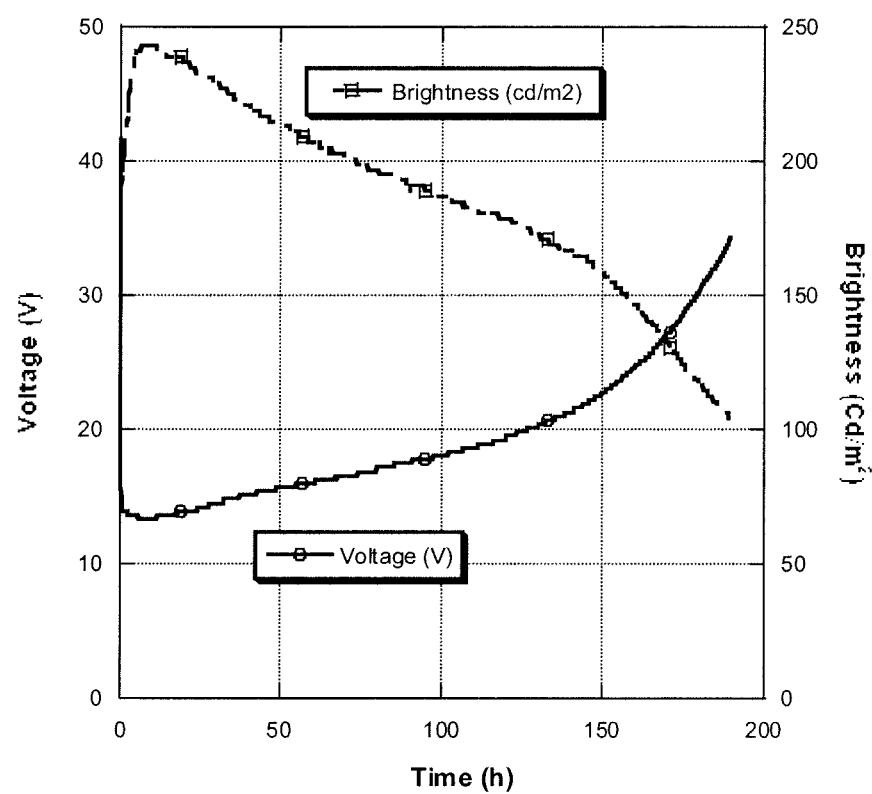
FIG. 5 shows device performance of A with the radical scavenger additive of Scheme 4 (Example 5).

This ink was formulated in a similar way as described above for Example 1, by adding additional 6 mg methyl-p-benzoquinone (MBQ, Scheme 4). It has a brightness lifetime (100 cd/m$^2$) of 880 h when 1.8 power factor is used (FIG. 5).

Scheme 4

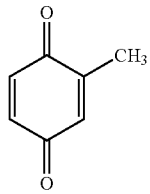

Example 6

Figure 6:
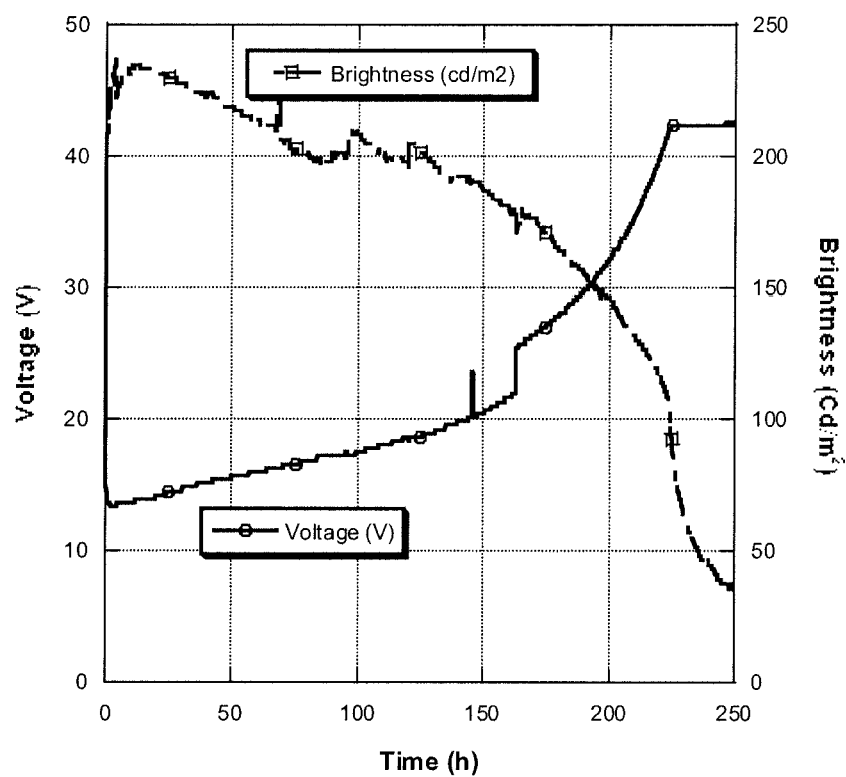
FIG. 6 shows device performance of A with the radical scavenger additive of Scheme 5 (Example 6).

This ink was formulated in a similar way as described above for Example 1, by adding additional 6 mg 2,3-dimethylhydroquinone (2,3-DMHQ, Scheme 5). It has a brightness lifetime (100 cd/m$^2$) of 1030 h when 1.8 power factor is used (FIG. 6). It is believed that this 2,3-DMHQ is more efficient to capture reactive radicals to form more stable quinone, as a result, longer device lifetime is achieved.

Scheme 5

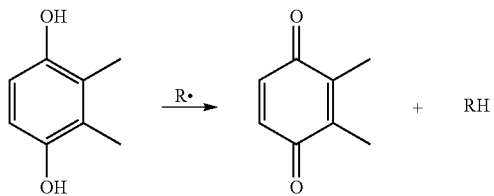

LEP Ink Mixed with UV Stabilizer

Example 7

Figure 7:
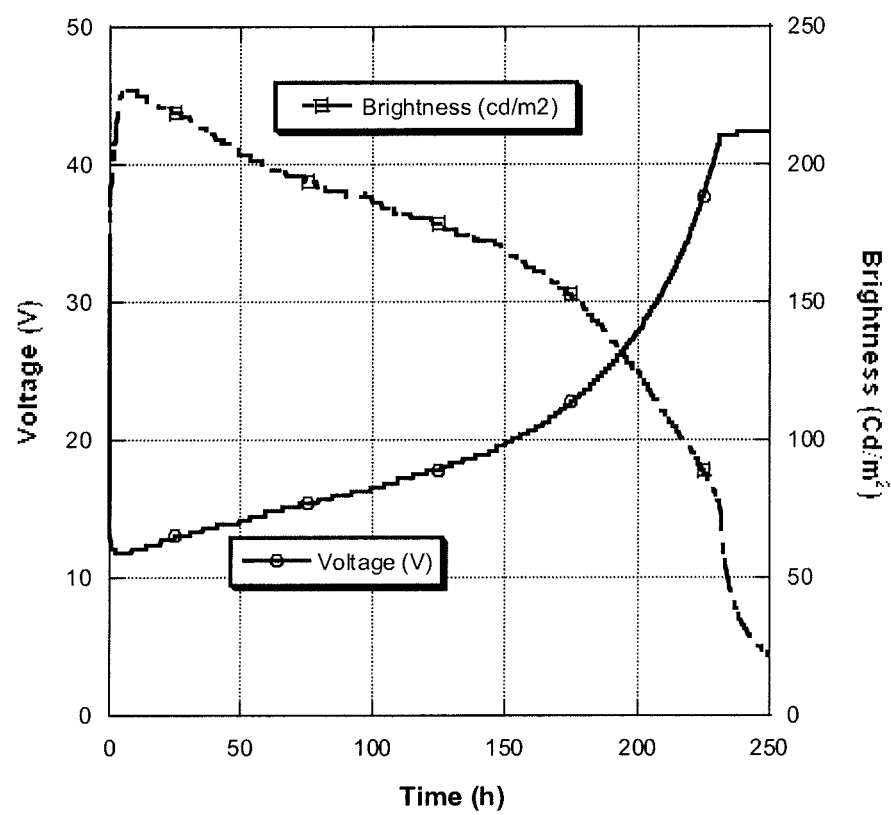
FIG. 7 shows device performance of A with the UV stabilizer of Scheme 6 (Example 7).

This ink was formulated in a similar way as described above for Example 1, by adding additional 6 mg 2-(2H-Benzotriazol-2-yl0-4,6-bis(1-methyl-1-phenylethyl)phenol) (BMPP, Scheme 6). It has a brightness lifetime (100 cd/m$^2$) of 915 h when 1.8 power factor is used (FIG. 7).

Scheme 6

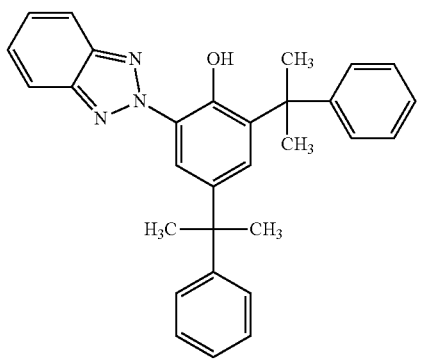

Example 8

Figure 8:
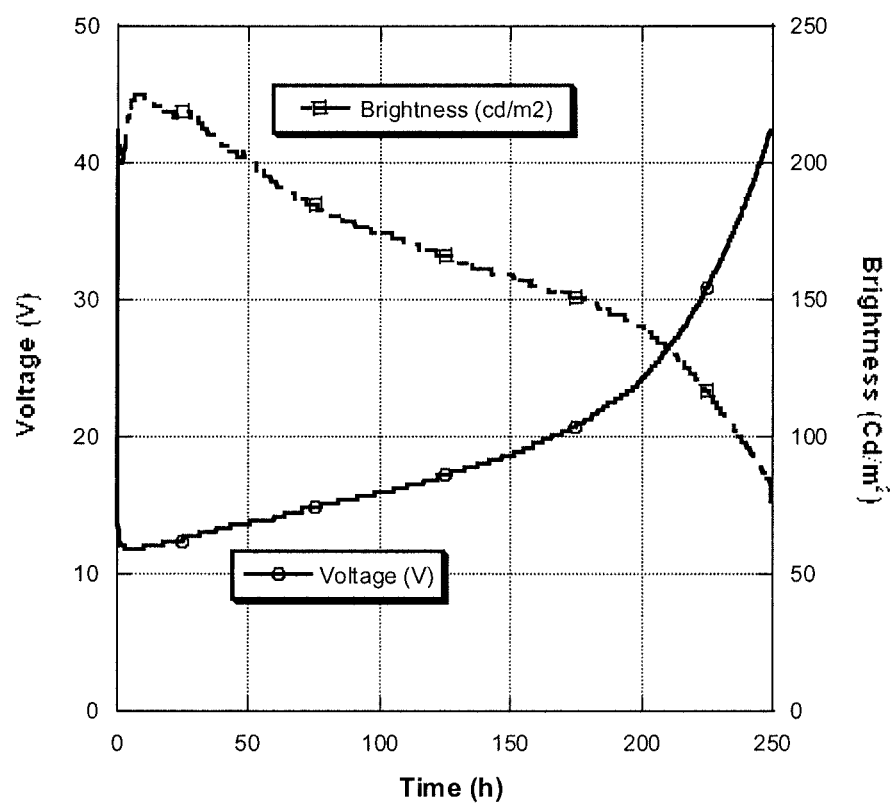
FIG. 8 shows device performance of A with the UV stabilizer of Scheme 7 (Example 8).

This ink was formulated in a similar way as described above for Example 1, by adding additional 6 mg 2-(4,6-diphenyl-1,3,5-triazin-2-yl)-5-[(hexyl)oxy]-phenol (DTHP, Scheme 7). It has a brightness lifetime (100 cd/m$^2$) of 990 h when 1.8 power factor is used (FIG. 8).

Scheme 7

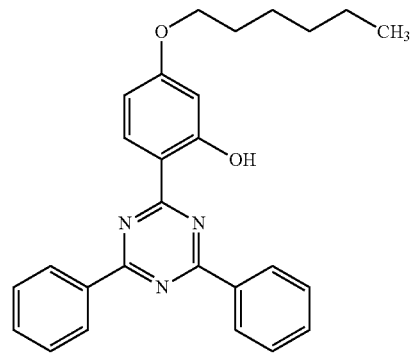

Table 1 summarizes device data for Examples 1-8.

TABLE 1

| Additive | Lmax (cd/m$^2$) | t$_{1/2}$ (h) for 100 cd/m$^2$ |
| --- | --- | --- |
| Standard A | 240 | 800 |
| BEOxa/Moisture getter | 225 | 900 |
| TDE/antioxidant | 205 | 1050 |
| EBP/antioxidant | 205 | 800 |
| MBQ/Radical scavenger | 245 | 880 |
| 2,3-DMHQ/radical scavenger | 235 | 1030 |
| BMPP/UV stabilizer | 225 | 915 |
| DTHP/UV stabilizer | 225 | 990 |

Standard Light-Emitting Polymer (LEP) Ink Formulation B

Example 9

Figure 9:
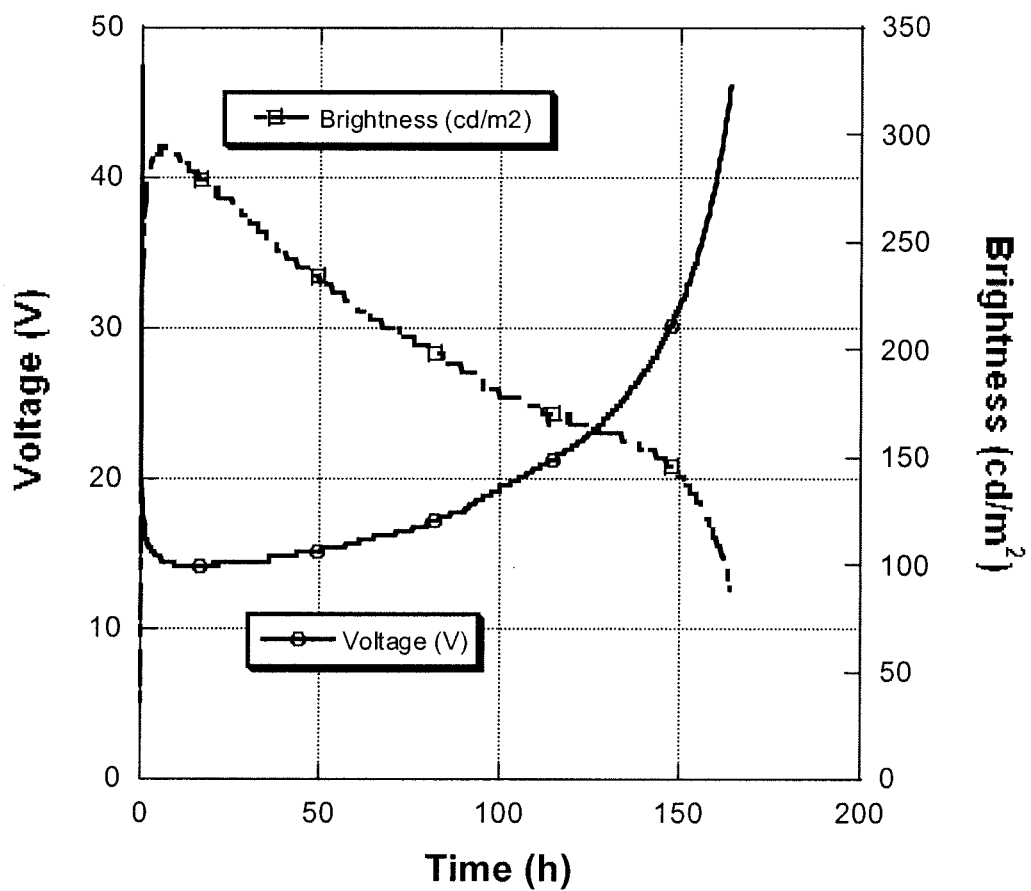
FIG. 9 shows device performance of formulation B with no additives (Example 9).

Standard LEP ink formulation B was made in a similar way as standard LEP formulation A, by replacing Mw 600,000 PEO with Mw 300,000 PEO. It has a brightness lifetime (100 cd/m$^2$) of 1020 h when 1.8 power factor is used (FIG. 9).

LEP Ink Mixed with Organic/Inorganic Hybrid Additives

Example 10

Figure 10:
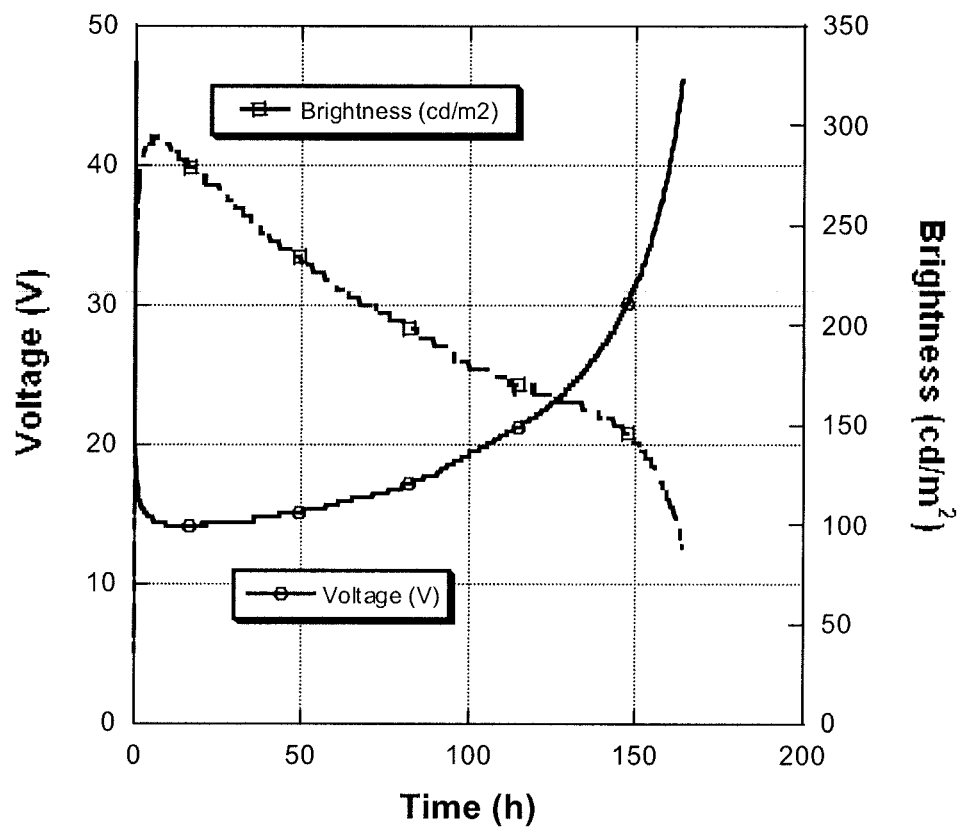
FIG. 10 shows device performance of B with the organic-inorganic (silane) additive of Scheme 8 (Example 10).

This ink was formulated in a similar way as described above for Example 10, by adding additional 6 mg triethoxy(octyl)silane (Silane 1, Scheme 8). It has a brightness lifetime (100 cd/m$^2$) of 1300 h when 1.8 power factor is used (FIG. 10).

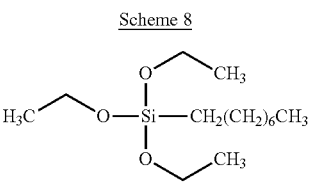

Scheme 8

Example 11

Figure 11:
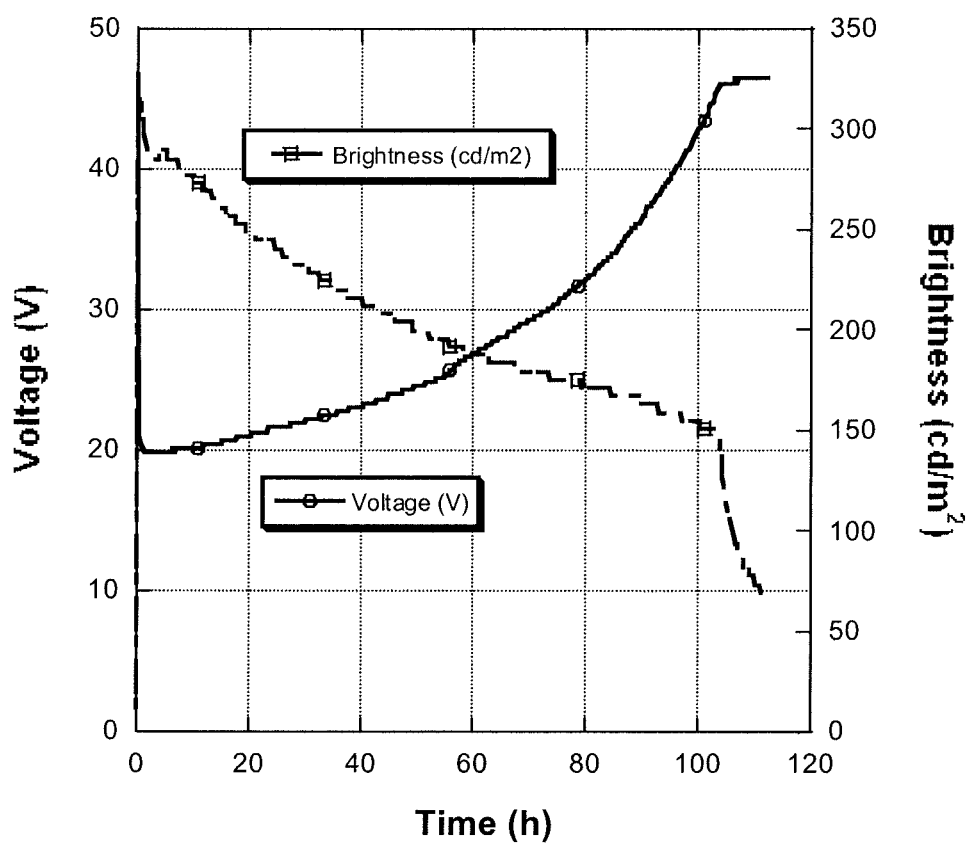
FIG. 11 shows device performance of B with the organic-inorganic (silane) additive of Scheme 9 (Example 11).

This ink was formulated in a similar way as described above for Example 10, by adding additional 6 mg triethoxyphenylsilane (Silane 2, Scheme 9). It has a brightness lifetime (100 cd/m$^2$) of 1240 h when 1.8 power factor is used (FIG. 11).

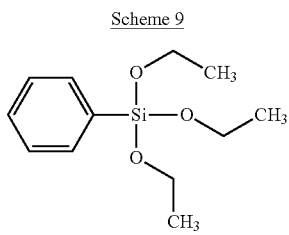 [SMILES: CCO[Si](OCC)(OCC)c1ccccc1]

Scheme 9

Example 12

Figure 12:
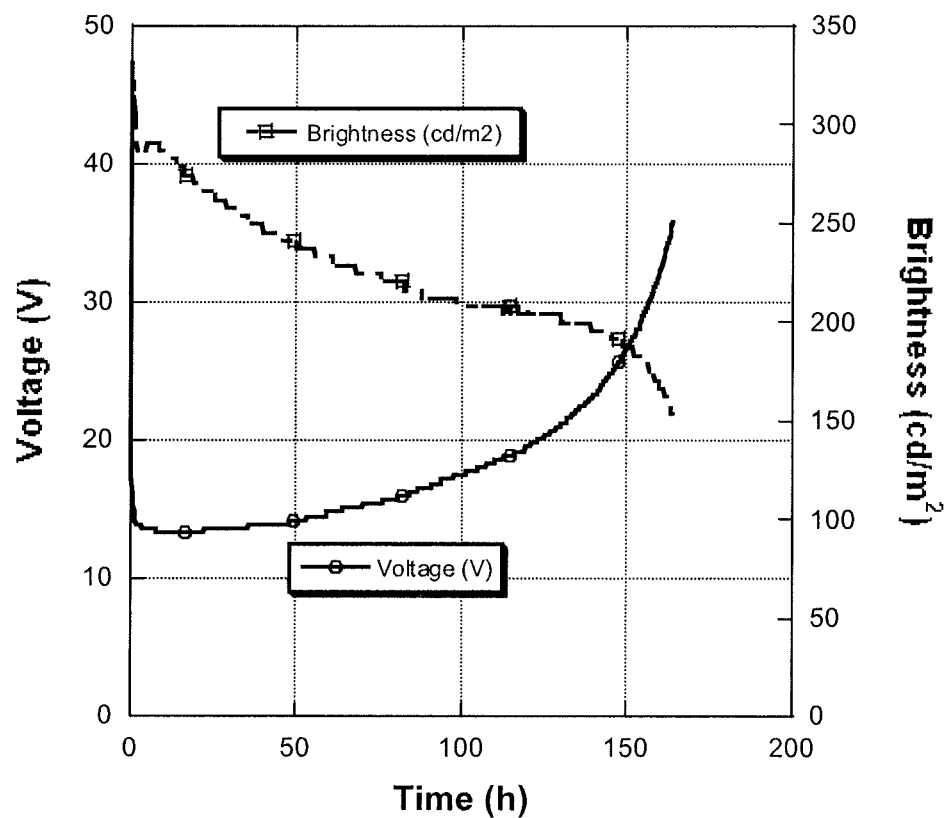
FIG. 12 shows device performance of B with the organic-inorganic (silane) additive of Scheme 10 (Example 12).

This ink was formulated in a similar way as described above for Example 10, by adding additional 6 mg tetraethyl orthosilicate (Silane 3, Scheme 10). It has a brightness lifetime (100 cd/m$^2$) of 1450 h when 1.8 power factor is used (FIG. 12).

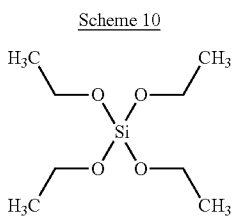

Scheme 10

Example 13

Figure 13:
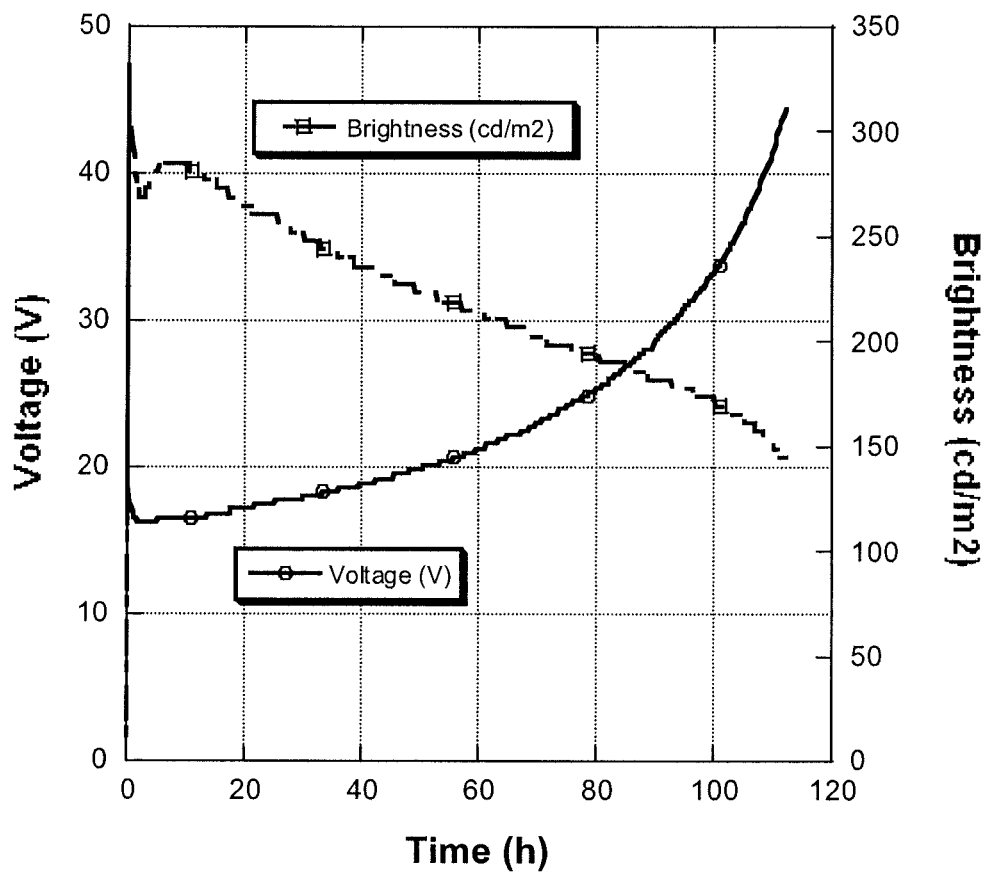
FIG. 13 shows device performance of B with the organic-inorganic silane) additive of Scheme 11 (Example 13).

This ink was formulated in a similar way as described above for Example 10, by adding additional 6 mg triethoxyvinylsilane (Silane 4, Scheme 11). It has a brightness lifetime (100 cd/m$^2$) of 1030 h when 1.8 power factor is used (FIG. 13).

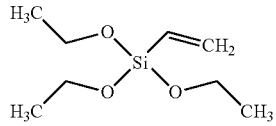

Scheme 11

Table 2 summarizes device data for Examples 9-13.

TABLE 2

| Additive | Lmax (cd/m$^2$) | $t_{1/2}$ (h) for 100 cd/m$^2$ |
|---|---|---|
| Standard B | 295 | 1020 |
| Silane 1 | 320 | 1300 |
| Silane 2 | 315 | 1240 |
| Silane 3 | 325 | 1450 |
| Silane 4 | 300 | 1030 |

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. An electroluminescent ink formulation comprising an electroluminescent organic compound as a luminescent material, an ionic salt, an ionic conducting polymer, an organic solvent, and an additive selected from the group consisting of organic moisture getters, hybrid organic/inorganic moisture getters, radical scavengers, antioxidants, ultraviolet stabilizers, and photoretarders.

2. The ink formulation of claim 1, wherein the organic moisture getter is a compound that is hydrolyzed at temperatures in the range between 20° C. and 200° C.

3. The ink formulation of claim 2, wherein the organic moisture getter is compound that is hydrolyzed at temperatures in the range between 59° C. and 200° C.

4. The ink formulation of claim 2, wherein the moisture getter includes a substituted oxazolidine.

5. The ink formulation of claim 1, wherein the hybrid organic/inorganic moisture getter is a compound that is hydrolyzed at temperatures in the range from 20° C. to 200° C.

6. The ink formulation of claim 5, wherein the hybrid organic/inorganic moisture getter is a compound that is hydrolyzed at temperatures in the range between 50° C. and 200° C.

7. The ink formulation of claim 5, wherein the hybrid organic/inorganic moisture getter includes a compound selected from the group consisting of substituted silanes, titanium (IV) compounds, and zirconium (IV) compounds.

8. The ink formulation of claim 1, wherein the radical scavenger includes a hydroquinone.

9. The ink formulation of claim 1, wherein the antioxidant includes a substituted phenol.

10. The ink formulation of claim 1, wherein the antioxidant includes a thioether.

11. The ink formulation of claim 1, wherein the ultraviolet stabilizer includes a functional group selected from the group consisting of benzophenones, benzotriazoles, triazines, benzoxazinones, and hindered benzoates, and hindered amines.

12. The ink formulation of claim 1, wherein the photoretarder includes a stilbene.

13. The ink formulation of claim 1, wherein the luminescent material is selected from the group consisting of conjugated polymers, oligomers, and dendrimers.

14. The ink formulation of claim 1, wherein the ionic salt includes an ion selected from the group consisting of lithium, cesium, calcium, barium, rubidium, magnesium, sodium, potassium, imidazolium, pyridium, pyrrolidinium, pyrazolium, pyrazole, phosphonium, ammonium, guanidinium, uranium, thiouronium, sulfonium, alkylsulfate, tosylate, methanesulfonate, trifluoromethanesulfonate, bis(trifluoromethylsulfonyl)imide, hexafluorophosphate, tetrafluoroborate, organoborate, thiocyanate, dicyanamide, and halide ions.

15. The ink formulation of claim 1, wherein the ionic conductor is selected from the group consisting of linear ionic conducting polymers or oligomers, star-shaped ionic conducting polymers or oligomers, block-ionic conducting polymers or oligomers, randomionic conducting co-polymers or co-oligomers, dendritic-ionic conducting molecules, comb-ionic conducting polymers or oligomers, and cyclic-ionic conducting molecules.

16. The ink formulation of claim 15, wherein the ionic conductor is selected from the group consisting of linear PEO, linear poly(propylene oxide) (PPO), linear poly(ethylene sulfide), polyphosphazene, polysiloxane, polyethylene imine, star-PEO, star-PEO with a silicon core, random copolymer or co-oligomer EO-PO (propylene oxide), random copolymer or co-oligomer EO-dimethylsiloxane, random copolymer or oligomer EO-methylphenyl siloxane, dendritic PEO, dendritic PEO with a silicon core, block-EO-PO-EO, block-PO-EO-PO, block-EO-dimethylsiloxane-EO, block-EO-methylphenylsiloxane-EO, comb-PEO, comb-branched polyphosphazene, branched polyethylene imine, alkyl, alkoxyl, or aromatic-substituted crown ether, and alkyl, alkoxyl, or aromatic-substituted aza-crown ether.

17. The ink formulation of claim 1, wherein the organic solvent is selected from the group consisting of toluene, anisole, cyclohexanone, cyclopentanone, m-xylene, o-xylene, p-xylene, and chlorobenzene.

18. The ink formulation of claim 1, wherein the luminescent ink viscosity at 100 rpm at room temperature is in a range of 1 to 200 cPs.

19. The ink formulation in claim 13, wherein the conjugated polymer, oligomer, or dendrimer contains a repeating unit selected from the group consisting of fluorene, spirofluorene, phenylene vinylene, phenylene ethynylene, carbazole, benzocarbazole, thiophene, and benzothiophene.

20. The ink formulation in claim 1, wherein phosphorescent metal complexes are doped into the ink formulation or chemically attached to the luminescent material.

* * * * *